US009390426B2

(12) United States Patent
Chung et al.

(10) Patent No.: US 9,390,426 B2
(45) Date of Patent: Jul. 12, 2016

(54) PERSONALIZED ADVERTISEMENT DEVICE BASED ON SPEECH RECOGNITION SMS SERVICE, AND PERSONALIZED ADVERTISEMENT EXPOSURE METHOD BASED ON PARTIAL SPEECH RECOGNITION SMS SERVICE

(75) Inventors: Hoon Chung, Gangwon-do (KR); Jeon Gue Park, Daejeon (KR); Hyung Bae Jeon, Daejeon (KR); Ki Young Park, Daejeon (KR); Yun Keun Lee, Daejeon (KR); Sang Kyu Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 484 days.

(21) Appl. No.: 13/604,006

(22) Filed: Sep. 5, 2012

(65) Prior Publication Data
US 2013/0117020 A1 May 9, 2013

(30) Foreign Application Priority Data
Nov. 7, 2011 (KR) .................. 10-2011-0115412

(51) Int. Cl.
| G10L 15/00 | (2013.01) |
| G10L 21/00 | (2013.01) |
| H04M 3/00 | (2006.01) |
| G06Q 30/02 | (2012.01) |
| G10L 15/26 | (2006.01) |
| G10L 25/63 | (2013.01) |

(52) U.S. Cl.
CPC .............. *G06Q 30/02* (2013.01); *G10L 15/265* (2013.01); *G10L 15/26* (2013.01); *G10L 25/63* (2013.01)

(58) Field of Classification Search
CPC .............................. G10L 15/265; H04M 3/51
USPC ...................................... 704/235; 379/265.13
See application file for complete search history.

(56) References Cited

U.S. PATENT DOCUMENTS

| 7,013,005 B2* | 3/2006 | Yacoub et al. ........... 379/265.13 |
| 8,509,403 B2* | 8/2013 | Chiu et al. ................ 379/114.13 |
| 2005/0033582 A1* | 2/2005 | Gadd et al. ..................... 704/277 |
| 2009/0117885 A1 | 5/2009 | Roth |
| 2012/0179694 A1* | 7/2012 | Sciacca et al. ................ 707/748 |

FOREIGN PATENT DOCUMENTS

KR    10-2011-0030229    2/2011

* cited by examiner

*Primary Examiner* — Farzad Kazeminezhad
(74) *Attorney, Agent, or Firm* — Staas & Halsey LLP

(57) ABSTRACT

Disclosed are a personalized advertisement device based on speech recognition SMS services and a personalized advertisement exposure method based on speech recognition SMS services. The present invention provides a personalized advertisement device based on speech recognition SMS services and a personalized advertisement exposure method based on speech recognition SMS services capable of maximizing an effect of advertisement by grasping user's intention, an emotion state, and positional information from speech data uttered by a user during a process of providing speech recognition SMS services, configuring advertisements from when speech data begins conversion to when it has been completely converted by the speech recognition into character strings, and exposing the configured advertisements to a user.

6 Claims, 4 Drawing Sheets

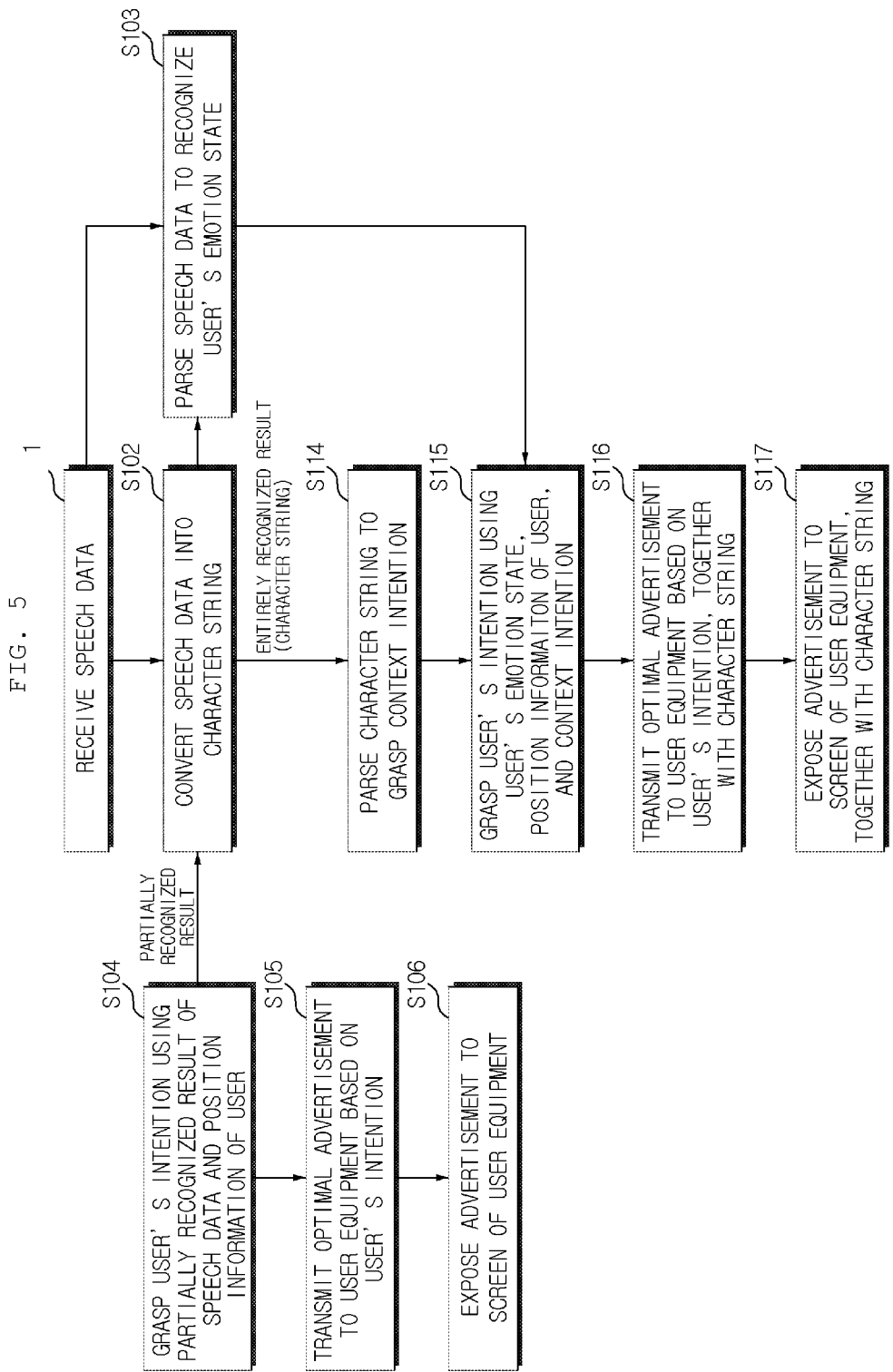

PERSONALIZED ADVERTISEMENT DEVICE BASED ON SPEECH RECOGNITION SMS SERVICE, AND PERSONALIZED ADVERTISEMENT EXPOSURE METHOD BASED ON PARTIAL SPEECH RECOGNITION SMS SERVICE

CROSS-REFERENCE TO RELATED APPLICATIONS

This application claims priority to and the benefit of Korean Patent Application No. 10-2011-0115412 filed in the Korean Intellectual Property Office on Nov. 7, 2011, the entire contents of which are incorporated herein by reference.

TECHNICAL FIELD

The present invention relates to a method for creating and providing personalized advertisement based on user's intention information and positional information extracted during a process of converting speech uttered by a user into a character message in speech recognition SMS conversion services based on a server-client and an apparatus for implementing the same, and more particularly, to implementation of the maximum effect of advertisement by exposing personalized advertisement based on user intention in speech recognition SMS services.

BACKGROUND ART

Recently, various types of speech recognition services have been provided from smart terminals, such as iPhone, Android phone, and the like, For example, services, such as placing a call or searching web using speech, converting speech into SMS, and the like, have been provided. The speech SMS conversion services based on a server-client among these services are services that allow a smart terminal to deliver speech to a server through a network in real time when a user of a smart terminal utters speech to be converted into characters and a speech recognition server to recognize speech signals, convert the recognized speech signals into characters, and transmit the converted results to the smart terminal.

In order to provide the speech recognition SMS conversion services based on the server-client, there is a need to operate a large-scale speech recognition server. Therefore, most of the major portal enterprises that mainly provide the services provide the services free of charge for entering a nascent market. It is expected that a demand for speech recognition services has been increased in future, which results in increasing maintenance costs of the services. Therefore, it may be difficult to continue to provide the speech recognition services free of charge. As a result, in order for the enterprises providing the services to generate revenue, it is expected that the enterprises add advertisements to the speech recognition SMS conversion services. However, most advertisements are exposed as spam advertising independent of the user's intention, which may lead to degradation in a service use frequency of a user.

SUMMARY OF THE INVENTION

The present invention has been made in an effort to provide a personalized advertisement device based on speech recognition SMS services and a personalized advertisement exposure method based on speech recognition SMS services capable of maximizing an effect of advertisement by grasping user's intention, an emotion state, and positional information from speech data uttered by a user during a process of providing speech recognition SMS services, configuring advertisements based thereon, and exposing the configured advertisements to a user.

An exemplary embodiment of the present disclosure provides a personalized advertisement device based on speech recognition SMS service, including: a speech recognition unit configured to convert input speech data into character strings; an emotion recognition unit configured to parse the input speech data to recognize a user's emotion state; a position recognition unit configured to receive positional information of a user; a context parsing unit configured to parse the input character strings from the speech recognition unit to grasp context intention; an intention grasp unit configured to grasp user's intention by using the user's emotion state from the emotion recognition unit, the positional information of the user from the position recognition unit, and the context intention from the context parsing unit; and an advertising selection unit configured to extract optimal advertisements from an advertisement database based on the user's intention from the intention grasp unit to transmit the extracted advertisements to user equipment, together with the character strings from the speech recognition unit.

The intention parsing unit may be differently operated in a first situation in which the speech recognition unit converts speech data into character strings and a second situation in which the speech data are converted into the character strings, in the first situation, the intention parsing unit may parse the user's intention using partially recognized results from the speech recognition unit and positional information of the user from the position parsing unit, and in the second situation, the intention parsing unit may parse the user's intention by using a user's emotion state from the emotion recognition unit, the position information of the user from the position recognition unit, and context intention from the content parsing unit.

In the first situation, the advertising selection unit may extract optimal advertisement from an advertisement database based on the user's intention from the speech recognition unit and transmit the extracted advertisements to user equipment, and in the second situation, the advertising selection unit may extract the optimal advertisements from the advertisement database based on the user's intention from the speech recognition unit and transmit the extracted advertisements to the user equipment, together with the character strings from the speech recognition unit.

The speech recognition unit may include: a feature vector string generation unit configured to convert the speech data into feature vectors for speech recognition; an acoustic model unit configured to include information obtained by modeling features and distributions generated by feature vectors for context-dependent phonemes configuring recognition object vocabularies; a word model unit configured to express information regarding words configuring recognition object vocabularies and connection and correlation between the words as probability information; and a Viterbi decoding unit configured to configure a search space using information from the acoustic model unit and information from the word unit model unit and perform recognition extracting a word string having an optimal path for the input feature vectors.

The emotion recognition unit may include: a pitch and energy extraction unit configured to extract the feature vectors for emotion recognition from the input speech data; an emotion model unit configured to include information obtained by modeling statistical characteristics about a phenomenon that the emotion feature vectors are generated in various emotion states of human beings; and a decoding unit configured to compare the input feature vectors with the information of the emotion model unit to output an emotion state having the highest similarity as the recognized results.

An another exemplary embodiment of the present disclosure provides a personalized advertisement exposure method based on speech recognition SMS service, including: receiving speech data; converting the input speech data into character strings; parsing the input speech data to recognize a user's emotion state; receiving position information of a user; parsing the character string to parse context intention; parsing user's intention by using the emotion state, the position information of the user, and the context intention; and extracting optimal advertisements from an advertisement database based on the user's intention and transmitting the extracted advertisements to user equipment, together with the character string from the speech recognition unit.

Between the "receiving of the speech data" and the "parsing of the character strings to grasp the context intention", grasping the user's intention using partially recognized results of the speech data and the position information of the user; and transmitting the optimal advertisements to the user equipment based on the user's intention may be additionally performed.

The "converting of the speech data into the character string" may include: converting the speech data into feature vectors for speech recognition; and configuring a search space using information from an acoustic model and using information from a word model and performing recognition extracting a word string having an optimal path for the input feature vectors, wherein the acoustic model includes information obtained by modeling features and distributions generated by the feature vectors for context-dependent phonemes configuring recognition object vocabularies and the word model expresses information regarding words configuring the recognition object vocabularies and connection and correlation between the words as probability information.

The "parsing the input speech data to recognize the user's emotion state" may include: extracting the feature vectors for emotion recognition from the input speech data; and comparing the input feature vectors with the information of the emotion model to output the emotion state having the highest similarity as the recognized results, wherein the emotion model may include information obtained by modeling statistical characteristics about a phenomenon that emotion feature vectors are generated in various emotion states of human beings.

According to the above configuration and method, the exemplary embodiments of the present invention can grasp the user's intention from the speech SMS and the positional information of the user in the speech SMS conversion services using the speech recognition server based on the server-client and present the advertisements suitable therefor, thereby increasing the access rate of the user to advertisement The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5 is a flow chart showing a personalized advertisement exposure method based on speech recognition SMS services according to another exemplary embodiment of the present invention.

Figure 1:
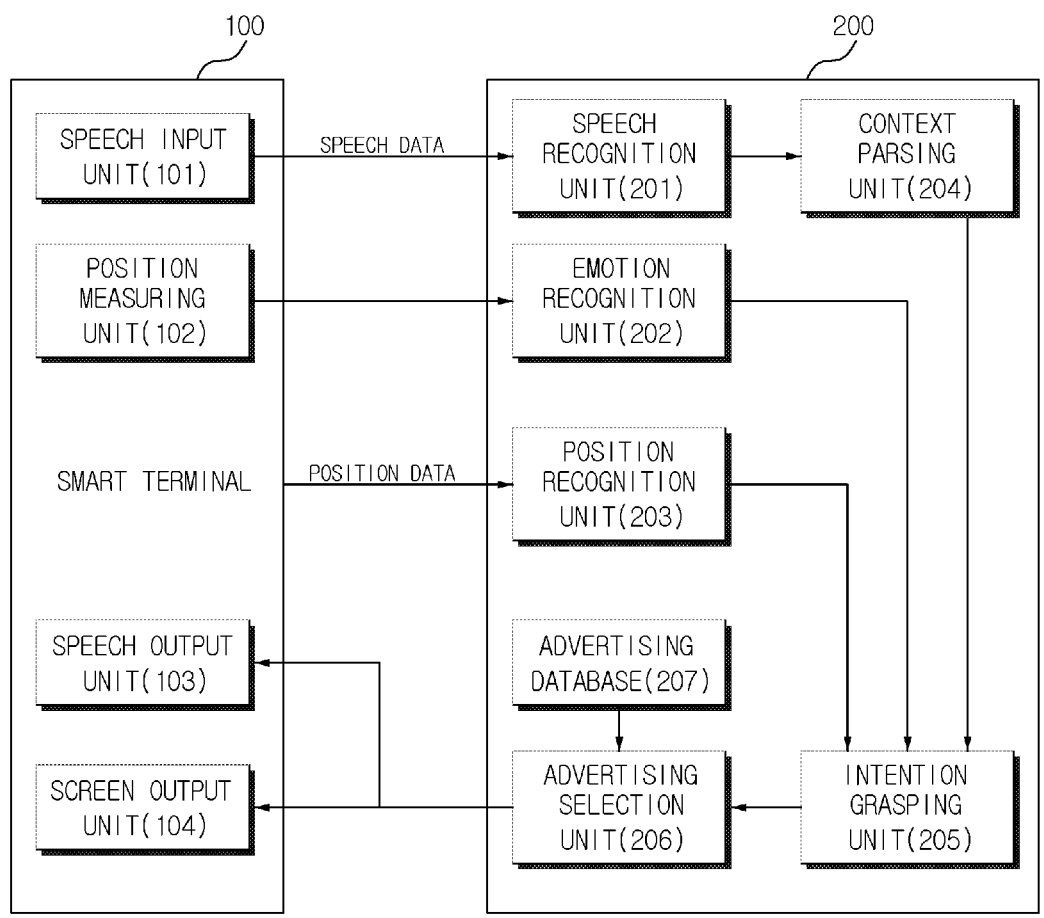
FIG. 1 is a block diagram showing a personalized advertisement device based on speech recognition SMS services according to an exemplary embodiment of the present invention.
Figure 2:
FIG. 2 is a diagram showing an example of a screen exposed to a user, a screen exposed to a user so as to receive speech from the user, and a screen exposed to a user during speech parse, when a user accesses a recognition server through smart terminals so as to receive speech conversion services.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Hereinafter, a personalized advertisement device based on speech recognition SMS services and a personalized advertisement exposure method based on speech recognition SMS services according to exemplary embodiments of the present invention will be described below with reference to the accompanying drawings.

First, a personalized advertisement device based on speech recognition SMS services according to an exemplary embodiment of the present invention will be described with reference to FIGS. 1 to 4.

As shown in FIG. 1, a personalized advertisement device 200 based on speech recognition SMS services may be configured to include: a speech recognition unit 201 configured to convert input speech data into character strings; an emotion recognition unit 202 configured to parse the input speech data to recognize a user's emotion state; a position recognition unit 203 configured to receive positional information of a user; a context parsing unit 204 configured to parse the input character strings from the speech recognition unit 203 to grasp context intention; an intention grasping unit 205 configured to grasp user's intention by using the user's emotion state from the emotion recognition unit 202, the positional information of the user from the position recognition unit 203, and the context intention from the context parsing unit 204; and an advertising selection unit 206 configured to extract optimal advertisements from an advertising database 207 based on the user's intention from the intention grasping unit 205 to transmit the extracted advertisements to user equipment, together with the character strings from the speech recognition unit 201.

Each component of the personalized advertisement device based on speech recognition SMS services according to the exemplary embodiment of the present invention having the above configuration will be described below.

Referring to FIG. 1, a smart terminal 100 used for a user to use speech recognition SMS conversion services based on a server-client may be configured to include a speech input unit 101, a position measuring unit 102, a speech output unit 103, and a screen output unit 104. The speech input unit 101 is to deliver speech to a server (that is, the personalized advertisement device according to the exemplary embodiment of the present invention), the position measuring unit 102 is to measure a current position of the smart terminal, the speech output unit 103 is to output speech advertisement, and the screen output unit 104 is to receive converted text information from the server.

The speech recognition SMS centered advertisements based on the server-client are differently exposed in a case in which a user utters speech and a case in which a user receives the recognized results. The first advertisement is exposed to a user during a process of allowing a user to access a recognition server for receiving SMS conversion services and utter speech, and converting the speech into a text in the server. In this case, information enough to parse and grasp user' intention is not provided. The information that can parse the user's intention corresponds to GPS information regarding a current position of a user and partially recognized results. Therefore, the user's intention is parsed using the information and the advertisement having correlation is exposed. The second advertisement is advertisement delivered when speech uttered by a user is converted into a text and then, delivered to user equipment, which is exposed as the personalized advertisement selected by grasping and exposing the intention of the speech uttered by the user.

Figure 3:
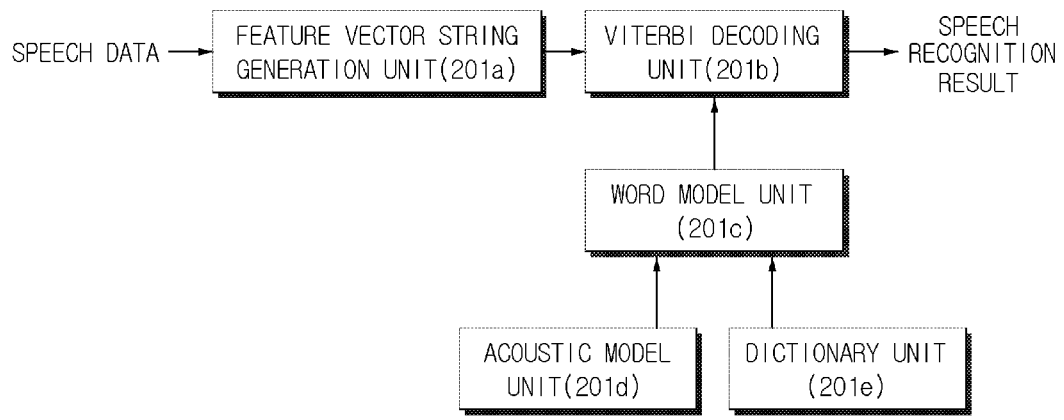
FIG. 3 is a block diagram showing a configuration example of the speech recognition unit of FIG. 1.

As described above, the first advertisement exposure is not exposed until the user accesses the speech recognition server to utter speech and receives the recognized results. When the user accesses the recognition server so as to receive the speech conversion services, as shown in FIG. 3, the recognition server informs that the user accesses the server and requests the user to utter speech to be converted into characters. When the user completes utterance, the recognition server informs that the speech recognition is progressed while the speech is converted into characters. The process is performed for several seconds to several tens of seconds. Therefore, advertisement is exposed meeting user intention for this period. For example, an advertising copy or a link based on partially recognized results and positions instead of a message "during parse" is output.

The second advertisement corresponds to a type of exposing the personalized advertisement to the user based on the results obtained by parsing the speech uttered by the user, together with the positional information, which will be described in detail.

The speech uttered by the user is converted into character strings by the speech recognition unit 201 and the context intention of the character strings is grasped by the context parsing unit 204. In addition, the speech uttered by the user is input to the emotion recognition unit 202 to recognize the user's emotion state. The intention grasping unit 205 grasps the user' intention using the information obtained by the recognition process and the positional information of the user and the advertising selection unit 206 extracts optimal advertisements from the advertising database 207 based on the grasped user's intention. Like the converted character strings, the extracted advertisements are transmitted to the smart terminal 100 and then output, thereby providing the personalized advertisement based on the speech SMS.

FIG. 3 shows a configuration example of the speech recognition unit 201 for converting the user's speech into the text. Referring to FIG. 3, the speech recognition unit 201 may be configured to include a feature vector string generation unit 201a, an acoustic model unit 201d, a dictionary unit 201e, a word model unit 201c, and a Viterbi decoding unit 201b.

The feature vector string generation unit 201a converts the speech signals into feature vectors suitable for recognition.

The acoustic model unit 201d includes information obtained by modeling feature and distributions generated by the feature vectors for context-dependent phonemes configuring recognition object vocabularies.

The word model unit 201c expresses information regarding words configuring the recognition object vocabularies and connection and correlation between the words as probability information.

The Viterbi decoding unit 201b is a module that performs real recognition using given speech and a predefined acoustic and language model and performs a recognition process of configuring a search space using the acoustic model and the language model and extracting a word string having an optimal path for the input feature vectors.

Figure 4:
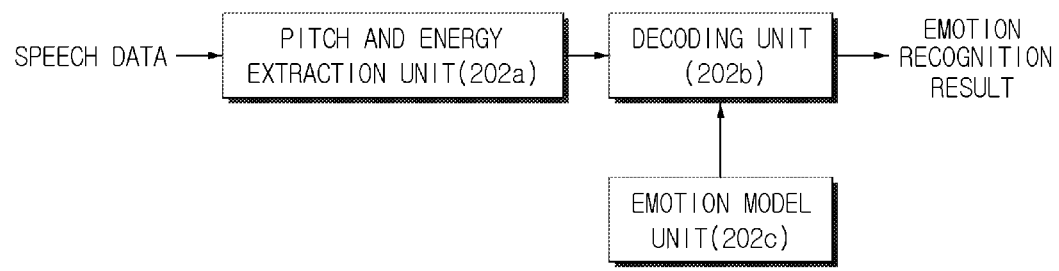
FIG. 4 is a block diagram showing a configuration example of an emotion recognition unit of FIG. 1.

FIG. 4 shows a configuration example of the emotion recognition unit 202 for recognizing emotion using the user speech. Referring to FIG. 4, the emotion recognition unit 202 is configured to include a pitch and energy extraction unit 202a, an emotion model unit 202c, and a decoding unit 202b and recognizes fundamental emotion such as stability, pleasure, sadness, anger, and the like, of human beings.

The pitch and energy extraction unit 202a extracts the feature vectors suitable for emotion recognition from the input speech. In this case, there are a frequency and pitch and energy information of the user as the mainly used feature vectors.

The emotion model unit 202c includes information obtained by modeling statistical characteristics about a phenomenon that the emotion feature vectors such as the frequency and the pitch and energy are generated in various emotion states of human beings. For example, in the case of anger, the emotion model unit 202c generally includes information such as the case in which the pitch and energy information of human beings is generally increased.

The decoding unit 202b corresponds to a kind of classifier. The emotion having the highest similarity is output as the emotion recognition results by measuring similarity with the emotion model in connection with the feature vectors for the input emotions.

The context parsing unit 204 grasps the context intention for a text sentence output as the speech recognition results. For example, if texts recognized as "Meet at Gangnam station at 7:00 pm today", "Let us see movie tomorrow" are present, the sentences are parsed. Therefore, the first sentence is parsed as including information regarding "promise+time+place" and in case of the second sentence, the intention included in the sentence such as "promise+object", and the like, is parsed.

The intention grasping unit 205 is a module that grasps the user's final intention by synthetically parsing all information parsed from the information provided by the user, the context results of the sentences, the emotion recognition results, and the positional information. For example, the user's intention may be estimated somewhat by using only the results of the sentence "Let us see movie" by the context parsing unit. However, when additional information as to whether the current position of the user is "Seoul Metropolis" or "Busan Metropolitan City", and the like, is used, more meaningful theater information may be provided to the user. In addition, movie playing information and review information suitable for the user's emotion state as to whether the uttered speech is in a comfortable state or a sad state, and the like, can be provided. That is, the user's intention grasping unit synthetically grasps the speech data uttered by the user and the position and time information to serve to extract information as to when, where, what, how speech is uttered.

As described above, when the user's intention is grasped from the SMS, the personalized advertisement corresponding thereto needs to be selected, which is provided by inputting items corresponding to the user's intention as a query within the advertising database 207. That is, the advertising selection unit 206 uses fields corresponding to "when, where, what, how" provided from the intention grasping unit 205 to extract the optimal advertisements from the advertising database 207.

The advertisements selected as described above are transmitted being included in additional information at the time of transmitting the SMS converted into the characters to the smart terminal 100 and thus, are exposed to the screen of the smart terminal 100, together with the characters.

Hereinafter, a personalized advertisement exposure method based on speech recognition SMS services according to another exemplary embodiment of the present invention will be described with reference to FIG. 5.

First, the speech recognition unit 201 and the emotion recognition unit 202 receive the speech data (S101).

Next, the speech recognition unit 201 converts the input speech data into the character strings and the emotion recognition unit 202 parses the input speech data to recognize the user's emotion state (S102 and S103).

Next, the context parsing unit 204 parses the character strings to grasp the context intention (S114).

Next, the intention grasping unit 205 grasps the user's intention using the emotion state, the user's position information, and the context intention (S115).

Next, the advertising selection unit 206 extracts the optimal advertisement from the advertising database 207 based on the user's intention and transmits the extracted advertisement to the user equipment, together with the character strings from the speech recognition unit 201, thereby exposing the advertisement to the screen of the user terminal, together with the character strings (S116 and S117).

Upon performing the processes as described above, the process of allowing the intention grasping unit 205 to grasp the user's intention using the partially recognized results of the speech data and the positional information of the user and then, the process of allowing the advertising selection unit 206 to transmit the optimal advertisement to the smart terminal 100 of the user based on the user's intention so as to expose the advertisement to the screen of the user equipment are performed together (S104, S105, and S106), between the process of receiving the speech data (S101) and the process of grasping the context intention by parsing the character strings (S115).

Further, when the speech recognition unit 201 converts the speech data into the character strings, the speech data are converted into the feature vectors for speech recognition and then, the search space is configured using the information from the acoustic model and the information from the word model, and the recognition extracting the word string having the optimal path for the input feature vectors is performed. In this case, the acoustic model includes the information obtained by modeling the features and distributions generated by the feature vectors for the context-dependent phonemes configuring the recognition object vocabularies and the word model expresses the information regarding the words configuring the recognition object vocabularies and the connection and correlation between the words as the probability information.

In addition, when the emotion recognition unit 202 parses the speech data to recognize the user's emotion state, the process of extracting the feature vectors for emotion recognition from the input speech data and then, comparing the input feature vectors with the information of the emotion model to output the emotion state having the highest similarity as the recognition results is performed. In this case, the emotion model includes the information obtained by modeling the statistical characteristics about the phenomenon in which the emotion feature vectors are generated in various emotion states of human beings.

The exemplary embodiments of the present invention as described above can detect the user's intention from the speech SMS and the positional information of the user in the speech SMS conversion services using the speech recognition server based on the server-client and present the advertisements suitable therefor, thereby increasing the access rate of the user to advertisement.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A personalized advertisement device based on a speech recognition SMS service, comprising:
    a speech recognition unit configured to convert input speech data into character strings;
    an emotion recognition unit configured to parse the input speech data to recognize an emotion state of a user;
    a position recognition unit configured to receive positional information of the user;
    a context parsing unit configured to parse the character strings from the speech recognition unit to grasp a context intention after the speech data has been completely converted into the character strings;
    an intention grasping unit configured to grasp a first intention of the user by using a partially recognized context intention while the speech data continues to be converted into the character strings and the positional information from the position recognition unit and the partially recognized context intention from the context parsing unit; and an advertising selection unit configured to extract a first advertisement from an advertising database, while the speech data continues to be converted by the speech recognition unit, and to transmit the extracted first advertisement to be displayed on user equipment, together with the character strings from the speech recognition unit, wherein the intention grasping unit is configured to grasp a second intention of the user by using completed results from the speech recognition unit, the emotion state of the user from the emotion recognition unit, and the positional information from the position recognition unit, and wherein the advertising selection unit is configured to extract an optimal second advertisement from the advertising database based on the second intention from the intention grasping unit and to transmit the extracted second advertisement to the user equipment after the speech data is completely converted into the character strings.

2. The personalized advertisement device of claim 1, wherein the speech recognition unit includes:
a feature vector string generation unit configured to convert the speech data into feature vectors for speech recognition;
an acoustic model unit configured to include information obtained by modeling features and distributions generated by feature vectors for context-dependent phonemes configuring recognition object vocabularies;
a word model unit configured to express information regarding words configuring recognition object vocabularies and connection and correlation between the words as probability information; and
a Viterbi decoding unit configured to configure a search space using information from the acoustic model unit and information from the word unit model unit and perform recognition by extracting a word string having an optimal path for the speech feature vectors.

3. The personalized advertisement device of claim 1, wherein the emotion recognition unit includes:
a pitch and energy extraction unit configured to extract feature vectors for emotion recognition from the speech data;
an emotion model unit configured to include information obtained by modeling statistical characteristics about a phenomenon that emotion feature vectors are generated in various emotion states of human beings; and
a decoding unit configured to compare the emotion feature vectors with the information of the emotion model unit to output an emotion state having the highest similarity as the recognized results.

4. A personalized advertisement exposure method based on a speech recognition SMS service, comprising:
receiving speech data of a user;
converting the speech data into character strings;
parsing the speech data to recognize an emotion state of the user;
receiving position information of the user;
parsing the character string to grasp a partially recognized context intension while the speech data continues to be converted into character strings, and then to grasp a context intention after the speech has been completely converted into the character strings;
grasping a first intention of the user by using the position information and the partially recognized context intention while the speech data is being converted into the character strings;
extracting a first advertisement from an advertising database while the speech data continues to be converted into the character strings and transmitting the extracted first advertisement to be displayed on user equipment, together with the character strings,
grasping a second intention of the user by using the context intention that is based on completely converted speech data of the user, the emotion state, and the position information;
extracting an optimal second advertisement from the advertising database based on the second intention of the user and transmitting the extracted optimal second advertisement to the user equipment after the speech data is converted into the character strings.

5. The personalized advertisement exposure method of claim 4, wherein converting the speech data into the character strings includes:
converting the speech data into feature vectors for speech recognition; and
configuring a search space using information from an acoustic model and using information from a word model and performing recognition by extracting a word string having an optimal path for the speech feature vectors,
wherein the acoustic model includes information obtained by modeling features and distributions generated by feature vectors for context-dependent phonemes configuring recognition object vocabularies, and the word model expresses information regarding words configuring the recognition object vocabularies and connection and correlation between the words as probability information.

6. The personalized advertisement exposure method of claim 4, wherein parsing the speech data to recognize the emotion state of the user includes:
extracting feature vectors for emotion recognition from the speech data; and
comparing the emotion feature vectors with the information of the emotion model to output the emotion state having the highest similarity as the recognized results,
the emotion model including information obtained by modeling statistical characteristics about a phenomenon that emotion feature vectors are generated in various emotion states of human beings.

* * * * *